United States Patent [19]

Kaul

[11] 4,042,591
[45] Aug. 16, 1977

[54] NAPHTHOQUINONE COMPOUNDS

[75] Inventor: Bansi Lal Kaul, Basel, Switzerland

[73] Assignee: Sandoz Ltd., Basel, Switzerland

[21] Appl. No.: 472,853

[22] Filed: May 23, 1974

[30] Foreign Application Priority Data

May 30, 1973 Switzerland ............ 7813/73
June 15, 1973 Switzerland ............ 8715/73

[51] Int. Cl.² ........................................ C07D 471/04
[52] U.S. Cl. ................... 260/272; 260/37 P;
260/250 Q; 260/251 Q; 260/256.4 H; 260/276;
260/288 CF; 260/289 C; 260/287 CF; 260/296
P; 260/297 F; 260/155; 260/294.8 A; 106/288
Q; 8/39 C; 544/219
[58] Field of Search ............... 260/272, 287 C, 295 A,
260/294.8 A, 294.9, 287 CF, 296 P, 297 F, 288
CF, 289 C, 248 CS

[56] References Cited

U.S. PATENT DOCUMENTS

| 2,772,274 | 11/1956 | Schmidt-Nickels et al. ... | 260/295 A |
| 2,773,873 | 12/1956 | Randall et al. ............ | 260/272 |
| 2,877,230 | 3/1959 | Long et al. ............... | 260/295 A |
| 3,057,847 | 10/1962 | Moser ...................... | 260/295 A |
| 3,057,870 | 10/1962 | Moser ...................... | 260/295 A |
| 3,057,871 | 10/1962 | Moser ...................... | 260/295 A |
| 3,309,400 | 3/1967 | Jenny ...................... | 260/295 A |
| 3,336,317 | 8/1967 | Inman et al. ............... | 260/287 C |

Primary Examiner—Paul M. Coughlan, Jr.
Assistant Examiner—Mark L. Berch
Attorney, Agent, or Firm—Gerald D. Sharkin; Richard E. Vila; Joseph J. Borovian

[57] ABSTRACT

Disclosed are compounds of formula I

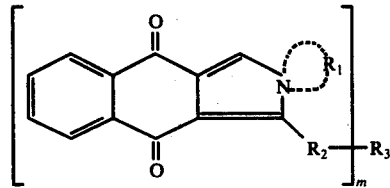

where $R_1$ is a fused benzene or naphthalene nucleus, $m$ is one or two and $R_2$ and $R_3$ have various significances, their production and use as pigments and disperse dyes.

48 Claims, No Drawings

NAPHTHOQUINONE COMPOUNDS

The invention relates to naphthoquinone compounds. The invention provides compounds of formula

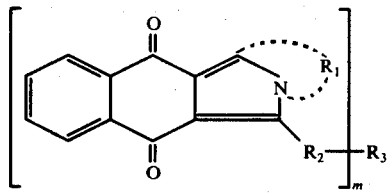

I in which
R₁ signifies a group of -CH=CH-CH=CH- or

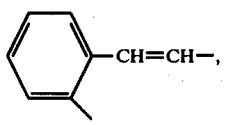

which group is unsubstituted or substituted by up to two substituents selected from chlorine, bromine, methyl and $C_{1-4}$ alkoxy or by one substituent selected from aminocarbonyl, $C_{1-4}$ alkylaminocarbonyl, phenylaminocarbonyl, carboxyl, either $C_{1-4}$ alkoxycarbonyl and phenoxycarbonyl, m signifies 1 and R₂ and R₃, together signify cyano; 2- or 4-pyridyl; 2-quinolyl; 2,4-dihydroxy-1,3,5-triazinyl; phenyl, unsubstituted or substituted by up to two substituents selected from chlorine, bromine, methyl, $C_{1-4}$ alkoxy, nitro and cyano; or —CO—R₅, where R₅ signifies hydroxy, methyl, $C_{1-4}$ alkoxy, phenyl or phenoxy, which phenyl or phenoxy is unsubstituted or substituted by up to two substituents selected from chlorine, bromine, methyl, nitro and cyano, provided that only one cyano is borne thereby, or m signifies 1, R₂ signifies —CO—NR₄—, in which R₄ signifies hydrogen or $C_{1-4}$alkyl, and R₃ signifies hydrogen; $C_{1-4}$alkyl; carbazolyl; thiazole anthronyl; pyrimide anthronyl; acridonyl; nitroacridonyl; anthraquinonyl which is unsubstituted or substituted by up two substituents selected from chlorine, bromine, methyl, $C_{1-4}$alkoxy, amino, hydroxy, phenylamino, phenylmercapto, nitro, benzoylamino, mono- or dichlorobenzoylamino, mono- or dibromobenzoylamino and nitrobenzoylamino; pyridyl; naphthyl; benzimidazolonyl; quinoxalinedionyl; phenyl, unsubstituted or substituted by up to three substituents selected from up to three chlorine or bromine atoms, up to two nitro, methyl or $C_{1-4}$alkoxy groups and one benzoylamino, mono- or dichlorobenzoylamino, mono- or dibromobenzoylamino, nitrobenzoylamino, alkylcarbonylaminobenzoylamino, aminocarbonyl, $C_{1-4}$alkylaminocarbonyl, phenylaminocarbonyl, mono-o di- or trichlorophenylaminocarbonyl, mono-, di- or tribromophenylaminocarbonyl, $C_{1-4}$alkylcarbonylaminophenylaminocarbonyl or $C_{1-4}$alkoxycarbonyl, or m signifies 1, R₂ signifies a radical (a), (b) or (c)

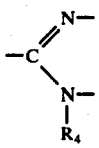 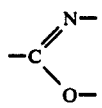 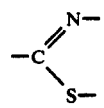

(a)     (b)     (c)

in which
R₄ is as defined above, and
R₃ signifies $C_{1-4}$alkylene; divalent pyridyl; divalent naphthyl; divalent benzimidazolonyl; divalent quinoxalinedionyl; divalent benzene, unsubstituted or substituted by up to two substituents selected from chlorine, bromine, methyl, $C_{1-4}$alkoxy and nitro; any aromatic radical as R₃ is bound to R₂ through adjacent carbon atoms; or m signifies 2, R₂ signifies —CONR₄—, where R₄ is as defined above, and R₃ signifies $C_{1-4}$alkylene; divalent anthraquinonyl, unsubstituted or substituted by up to two substituents selected from chlorine, bromine, methyl, $C_{1-4}$alkoxy, amino, hydroxy, phenylamino, phenylmercapto, nitro, benzoylamino, mono- or di-chlorobenzoylamino, mono- or di-bromobenzoylamino and nitrobenzoylamino; divalent pyridyl; divalent naphthyl; divalent benzimidazolonyl; divalent quinoxalinedionyl; divalent benzene, unsubstituted or substituted by up to two substituents selected from chlorine, bromine, methyl, alkoxy and nitro; divalent diphenyl, unsubstituted or substituted by up to two substituents selected from chlorine, bromine, methyl, $C_{1-4}$alkoxy and nitro; a radical (d)

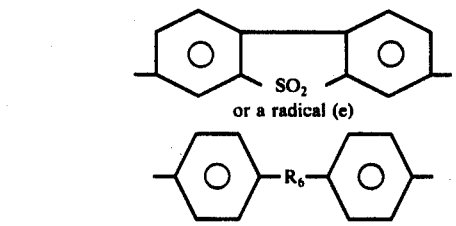

or a radical (e)

in which
R₆ Signifies —S—, —SO₂—, —NH—CO— or —N═N—;

m signifies 2, R₂ signifies a radical (a), (b) or (c), above, and R₃ signifies a tetravalent diphenyl radical, the links between such radical and radicals (a), (b) or (c) being through adjacent carbon atoms.

In the compounds of formula I, R₁ preferably signifies an unsubstituted —CH=CH—CH=CH— or

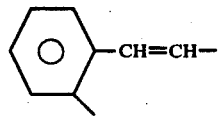

group.

Preferably either m signifies 1 and R₂ and R₃, together, signify —CO—R₅, in which R₅ is as defined above, or m signifies 1, R₂ signifies —CONR₄—, in which R₄ signifies hydrogen or $C_{1-4}$alkyl, and R₃ signifies carbazolyl; thiazole anthronyl; pyrimide anthronyl;

acridonyl; nitroacridonyl; anthraquinonyl, unsubstituted or substituted by up to two substituents selected from chlorine, bromine, methyl, $C_{1-4}$alkoxy, amino, hydroxy, phenylamino, phenylmercapto, nitro, benzoylamino, mono- or dichlorobenzoylamino, mono- or di-bromobenzoylamino, and nitrobenzoylamino; pyridyl; naphthyl; benzimidazolonyl; quinoxalinedionyl; phenyl; unsubstituted or substituted by up to three substituents selected from up to three chlorine or bromine atoms, up to two nitro, methyl or methoxy groups and one benzoylamino, mono- or dichlorobenzoylamino, mono- or dibromobenzoylamino, nitrobenzoylamino, $C_{1-4}$alkylcarbonylaminobenzoylamino, aminocarbonyl, $C_{1-4}$alkylaminocarbonyl, phenylaminocarbonyl, mono- ,di- or trichlorophenylaminocarbonyl, mono-, di- or tribromophenylaminocarbonyl, $C_{1-4}$alkylcarbonylaminophenylaminocarbonyl or $C_{1-4}$alkoxycarbonyl group; or m signifies 1, $R_2$ signifies a radical (a), (b) or (c), and $R_3$ signifies divalent pyridyl; divalent naphthyl; divalent benzimidazolonyl; divalent quinoxalinedonyl; divalent benzene, unsubstituted or substituted by up to two substituents selected from chlorine, bromine, methyl, $C_{1-4}$alkoxy and nitro; or m signifies 2, $R_2$ signifies —$CONR_4$—, where $R_4$ is as defined above, and $R_3$ signifies divalent anthraquinonyl, unsubstituted or substituted by up to two substituents selected from chlorine, bromine, methyl, $C_{1-4}$alkoxy, amino, hydroxy, phenylamino, phenylmercapto, nitro, benzoylamino, mono- or di-chlorobenzoylamino, mono- or di-bromobenzoylamino and nitrobenzoylamino; divalent pyridyl; divalent naphthyl; divalent benzimidazolonyl; divalent quinoxalinedionyl; divalent benzene, unsubstituted or substituted by up to two substituents selected from chlorine, bromine, methyl, $C_{1-4}$alkoxy and nitro; divalent diphenyl, unsubstituted or substituted by up to two substituents selected from chlorine, bromine, methyl, $C_{1-4}$alkoxy and nitro; a radical (d) or a radical (e), or m signifies 2, $R_2$ signifies a radical (a), (b), (c), above, and $R_3$ signifies a tetravalent diphenyl radical.

$R_4$ preferably signifies hydrogen.

Further preferred compounds are those in which either m signifies 1, $R_2$ signifies —CONH— and $R_3$ signifies phenyl, unsubstituted or substituted by up to two substituents selected from chlorine, bromine, nitro, methoxy and ethoxy or by one substituent selected from phenylaminocarbonyl, chlorophenylaminocarbonyl, bromophenylaminocarbonyl, acetylaminophenylaminocarbonyl, benzoylamino, chlorobenzoylamino, bromobenzoylamino and acetylaminobenzoylamino, or anthraquinonyl, unsubstituted or mono-substituted by chlorine, bromine, methyl, methoxy, amino, nitro or benzoylamino; or m signifies 2, $R_2$ signifies -COHN- and $R_3$ signifies 1,3-, 1,4- or 1,5- phenylene or 4,4'-diphenylene, which phenylene and diphenylene are unsubstituted or substituted by one or two substituents selected from chlorine, bromine, methyl, methoxy, ethoxy and nitro, or m signifies 12, $R_2$ signifies

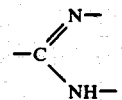

and $R_3$ signifies a tetravalent diphenylene radical. Especially preferred compounds are those of formula Ib,

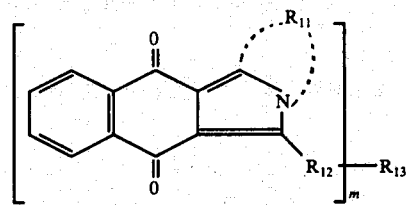

in which $R_{11}$ signifies unsubstituted -CH=CH-CH=CH or

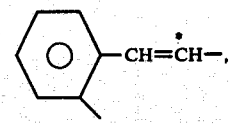

in which the *C is bound to the nitrogen atom, $R_{12}$ signifies —CONH and, either m signifies 1 and $R_{13}$ signifies 4-phenylaminocarbonylphenyl or anthraquinonyl, or m signifies 2 and $R_{13}$ signifies 2-chloro-1,4-phenylene, 2-methyl-1,4-phenylene, 2,5-dichloro-1,4-phenylene, 2,4-dichloro-1,5-phenylene or 2,2'-dimethoxy-4,4'-diphenylene.

The invention also provides a process for the production of compounds of formula I, characterised by a. reacting a compound of formula II,

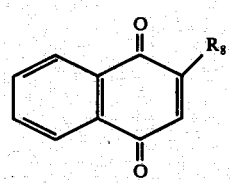

in which $R_8$ signifies hydrogen, chlorine, bromine or -$SO_3M$, where M is an alkali metal or alkaline earth metal cation, with an ylide of formula III,

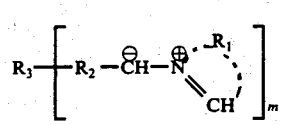

in which m, $R_1$, $R_2$ and $R_3$ are as defined above, obtaining a compound of formula Id, Id -continued

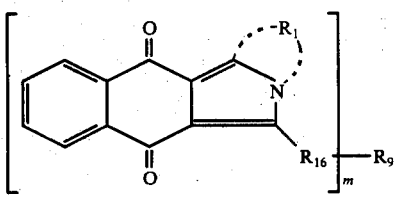

in which
R$_1$ is as defined above, and either
  m signifies 1, R$_{16}$ signifies —CONR$_4$— and R$_9$ signifies carbazolyl; thiazole athronyl; pyrimide anthronyl; acridonyl; nitroacridonyl; anthraquinonyl, unsubstituted or substituted by one or two substituents selected from chlorine, bromine, methyl, C$_{1-4}$alkoxy, amino, hydroxy, phenylamino, phenylmercapto, nitro, benzoylamino, mono- or dichlorobenzoylamino, mono- or dibromobenzoylamino and nitrobenzoylamino; pyridyl; naphthyl; benzimidazole; quinoxalinedionyl; phenyl, unsubstituted or substituted by up to three substituents selected from up to three chlorine or bromine atoms, up to two substituents selected from nitro, methyl and C$_{1-4}$alkoxy and one substituent selected from benzoylamino, mono- or dichlorobenzoylamino, mono- or di-bromobenzoylamino, nitrobenzoylamino, C$_{1-4}$alkylcarbonylaminobenzoylamino, aminocarbonyl, C$_{1-4}$alkylaminocarbonyl, phenylaminocarbonyl, mono-, di- or tri-chloro- or -bromo-phenylaminocarbonyl, C$_{1-4}$alkylcarbonylaminophenylaminocarbonyl and C$_{1-4}$alkoxy carbonyl; or
  m signifies 1, R$_{16}$ signifies a group (a), (b), or (c), above, and R$_9$ signifies C$_{1-4}$alkylene; divalent pyridyl; divalent naphthyl; divalent benzimidazolone; divalent quinoxalinedionyl; or divalent benzene, unsubstituted or substituted by up to two substituents selected from chlorine, bromine, methyl, C$_{1-4}$alkoxy and nitro; or
  m signifies 2, R$_{16}$ signifies a group —CONR$_4$—, where R$_4$ is as defined above, and R$_9$ signifies C$_{1-4}$alkylene; divalent anthraquinonyl, unsubstituted or substituted by up to two substituents selected from chlorine, bromine, methyl, C$_{1-4}$alkoxy, amino, hydroxy, phenylamino, phenylmercapto, nitro, benzoylamino, mono- or dichloro- or -bromo-benzoylamino and nitrobenzoylamino; divalent pyridine; divalent naphthalene, divalent benzimidazolonyl; divalent quinoxalinedionyl; divalent benzene, unsubstituted or substituted by up to two substituents selected from chlorine, bromine, methyl, C$_{1-4}$alkoxy and nitro; or a radical (d) or (e), above, or
  m signifies 2, R$_{16}$ signifies a group (a), (b) or (c), above and R$_9$ signifies a tetra-valent diphenyl radical, characterised by condensing a compound of formula V,

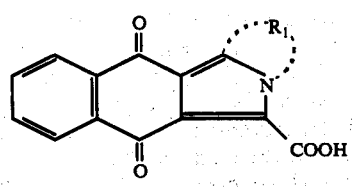

in which

R$_1$ is as defined above, or a functional derivative thereof,
with an amine of formula VI,

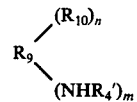

in which
R$_9$ and m are as defined above,
R$_{10}$ signifies NH$_2$, OH or -SH,
n signifies 0, 1 or 2 but is not greater than m,
R$_4$' has the same significance as R$_4$, above, with the proviso that it signifies hydrogen when R$_{10}$ signifies —OH or —S, and where
R$_9$ is of aromatic nature, any radical as R$_{10}$ is bound in ortho position to any —NHR$_4$ group.

The processes are conveniently carried out in conventional manner.

In process (a), the mol ratio of compounds II to compounds III is preferably m:1. The reaction is suitably carried out in an inert organic solvent, such as in a lower, e.g., C$_{1-4}$, alcohol, dimethylformamide, dimethyl acetamide, dimethylsulphoxide, nitrobenzene, or chlorobenzene. A suitable reaction temperature is from 0° to 200° C, preferably from 0° to 100° C. The reaction is advantageously carried out in the presence of a mild oxidising agent and to this end, an excess of the compound II may be employed, having itself an oxidising effect.

In process (b), the mol ratio of compounds V to compounds VI is preferably m:1. As examples of functional derivatives of the compounds of formula V may be given the lower alkyl, e.g. methyl and ethyl esters and the acid halides, the most preferred functional derivative being the acid chloride. The reaction is suitably carried out in an inert, anhydrous organic solvent, e.g. in nitrobenzene, chlorobenzene, dimethylformamide or in a mixture thereof. A suitable reaction temperature is from 20° to 250° C, preferably from 50° to 160° C.

The compounds of formula III, used in process (a), above, may be obtained by reacting a compound of formula IV,

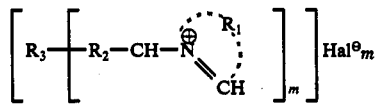

in which
R$_1$, R$_2$, R$_3$ and m are as defined above, and
Hal signifies chloride or bromine, with a basic compound, such as with triethylamine, sodium or potassium carbonate, or an alcoholate.

The compounds of formulae II, IV and VI are either known or may be obtained in conventional manner from available starting materials.

The acid chloride derivatives of those compounds of formula V which are of formula Va Va

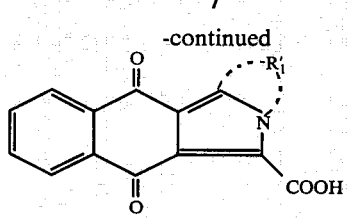

in which
R$_1$' signifies a group —CH=CH—CH=CH— or

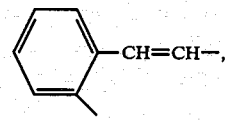

which group is unsubstituted or substituted by up to two substituents selected from chlorine, bromine, methyl and C$_{1-4}$alkoxy, or by a C$_{1-4}$alkylcarbonyl or benzoyl group, may be obtained, in conventional manner, by reacting a compound of formula Ic,

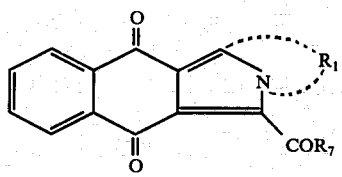

in which
R$_1$' is as defined above, and
R$_7$ signifies a hydroxyl, C$_{1-4}$alkoxy or phenoxy group, with thionyl chloride or phosphorus trichloride.

The compounds of formula Ic are, of course, obtainable by process (a) above.

The compounds of formula I, particularly those of high molecular wieght, e.g. where m is 2, are useful as pigments, especially after the normal conditioning of pigments, and are indicated for use in the pigmenting of plastics in the mass. This term is understood to refer to plastics or synthetic resins in the mass containing or free from solvents. They are also indicated for use as pigments in surface coatings whether of an oil or water base, lacquers of various composition, spinning solutions of viscose or cellulose acetate, for the pigmentation of polyethylene, polystyrene, polyvinyl chloride, rubber and synthetic leather. The compounds of formula I are also suitable for use in printing inks, for dyeing paper in the stock, for the coating of textiles or the pigment printing.

The dyeings obtained have a notable light and migration fastness, a notable fastness to over-spraying and solvents and good transparency and heat stability.

These compounds of formula I in which m is 1 are also indicated for use as disperse dyes. For this purpose they are, however, preferably converted into dyeing preparations.

The compounds are converted into disperse-dyeing preparations by the known methods, e.g. by grinding in the presence of dispersing agents and/or fillers, optionally with subsequent drying in a vacuum or atomizer drier. After the addition of a suitable volume of water and dyeing preparations can be used for exhaust dyeing, pad dyeing or printing from long or short liquor ratio baths. From aqueous suspension the dyes build up well on textiles consisting of synthetic or semisynthetic organic fibres of high molecular weight and hydrophobic character. They are specially suitable for dyeing or printing textiles of linear aromatic polyesters, cellulose 2½ acetate, cellulose triacetate and synthetic polyamide fibres.

Conventional dyeing and printing methods may be used, for example as described in French Pat. No. 1,445,371.

The dyeings obtained have good all-round fastness, with notably good fastness to light, thermofixation, sublimation and pleating. They are notably fast to wet treatments, e.g. water, seat water, washing, perspiration, solvents, dry cleaning, lubricants and to rubbing, cross dyeing, ozone, flue gas and chlorine. They are stable to the pre-cure and post-cure permanent press finishing processes and to soil release finishing.

The new compounds of formula I are also suitable as vat dyes.

In the following Examples the parts are by weight and the temperatures in degrees centigrade.

EXAMPLE 1 a. A mixture consisting of 251.5 parts of N-(ethoxycarbonyl-methyl)-isoquinoline-chloride and 2000 parts of absolute ethanol is cooled with stirring to 0° to 5° and a solution, cooled to 0°-5°, of 23 parts of sodium in 1000 parts of absolute ethanol is added thereto. The mixture is stirred for approximately 10 minutes until the precipitation of the sodium chloride is complete. 180 Parts of powdered 1,4-naphthoquinone are subsequently added with stirring and always with cooling. The mixture is stirred at 0°-5° over the course of 2 hours and then at room temperature over the course of 12 hours.The precipitated yellow, crystalline product is filtered off, washed with ethanol, water and again with ethanol and dried. The product agress with formula

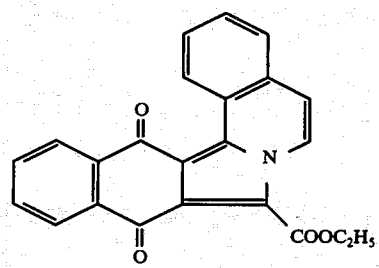

| Analysis:    | C    | H   | N   |
|--------------|------|-----|-----|
| Theoretical: | 74.8 | 4.1 | 3.8 |
| Found:       | 74.8 | 4.1 | 3.5 | b. 200 parts of 20% sodium hydroxide solution are added at 78° with stirring over the course of 15 minutes consisting of 120 parts of the compound obtained in accordance with (a) and 1200 parts of ethanol. The mixture is boiled at reflux for 30 minutes. The resulting insoluble saponification product is filtered off at 20°, washed with ethanol, water and again with ethanol, boiled at reflux over the course of 30 minutes in 1200 parts of acetic acid, filtered at 20°, washed with acetic acid, then with water and dried at 100° in a vacuum.

This dye as well as the compound obtained in accordance with (a) are valuable disperse dyes.

c. 6.82 Parts of the carboxylic acid obtained in accordance with (b) are mixed with 250 parts of nitrobenzene, 0.5 parts of dimethyl formamide and 10 parts of thionyl chloride and the mixture is stirred at 90°–100° over the course of 2 hours. The excess thionyl chloride together with approximately 50 parts of nitrobenzene are subsequently distilled off at 120° in a vacuum. To the remaining reddish-yellow solution are added 4.5 parts of 2-amino-anthraquinone and the mixture is heated with stirring to 120° over the course of 2 hours and to 140° over the course of two further hours. The reddish-yellow precipitate is filtered off at 120°, washed with nitrobenzene, dimethyl formamide, water and finally with ethanol and then dried. The resulting pigment of formula

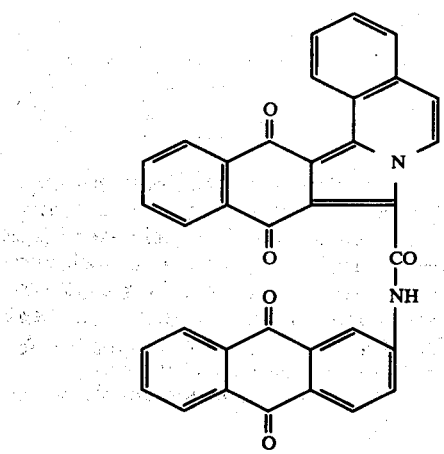

has a melting point of above 300°.

| Analysis: | C | H | N | O |
|---|---|---|---|---|
| Theoretical: | 76.9 | 3.3 | 5.1 | 14.6 |
| Found: | 76.8 | 3.4 | 4.8 | 14.9 |

By repeating the above process (c) but replacing the 4 parts of 2-aminoanthraquinone by 1.77 parts of 1,4-diamino-2,5-dichlorophenylene, there is obtained the pigment of formula

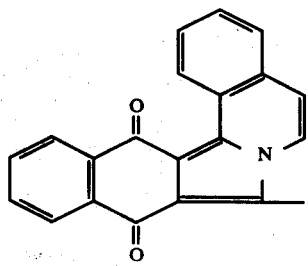

d. Replacing in (a) the N-(ethoxycarbonyl-methyl)-isoquinoline-chloride by the same amount of N-(ethoxycarbonyl-methyl)-quinoline-chloride, dyestuffs with very similar properties are obtained in accordance with (a), (b) and (c).

EXAMPLE 2

17 Parts of pyridine are added with stirring at 20° over the course of 1 hour, to a solution of 42.5 parts of 1-chloroacetyl-(3-nitro)-anilide in 400 parts of dimethyl formamide. The mixture is stirred at 74° for 1 further hour, cooled to 0°–5° and 15 parts of potassium carbonate are then added thereto. The mixture is then sitrred at 0°–5° over the course of 1 hours. A solution of 32.0 parts of 1,4-naphthoquinone in 200 parts of dimethyl formamide is added over the course of 1 hour and the mixture is stirred at 0°–5° for 2 hours and at room temperature for a further 2 hours. The precipitated red cystalline slurry is filtered off, washed first with dimethyl formamide, then with ethanol and finally with water and dried in a vacuum. Applied on polyvinyl chloride it gives red shades with excellent fastness properties. The compound agrees with formula

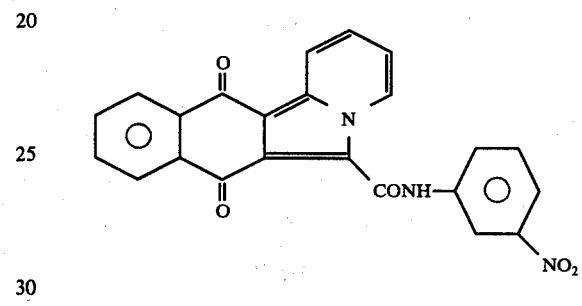

| Elementary analysis: | C | H | N | O |
|---|---|---|---|---|
| Theoretical: | 67.2 | 3.2 | 10.2 | 19.4 |
| Found: | 66.8 | 3.3 | 10.2 | 19.3 |

EXAMPLE 3

Replacing the 17 parts of pyridine in Example 2 by 26 parts of isoquinoline, the reddish-yellow compound, which agrees with formula

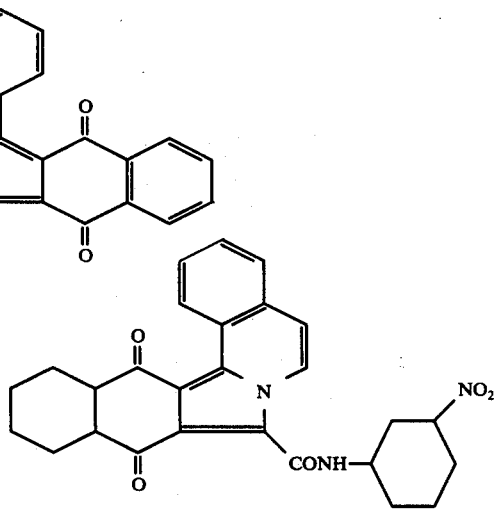

is obtained.

| Analysis: | C | H | N | O |
|---|---|---|---|---|
| Theoretical: | 70.3 | 3.3 | 9.1 | 17.3 |
| Found: | 70.1 | 3.2 | 9.0 | 17.0 |

EXAMPLE 4

Replacing the 1-chloroacetyl-(3-nitro)-anilide in Example 2 by 1-chloroacetyl-(4-nitro)-anilide, the red compound of formula

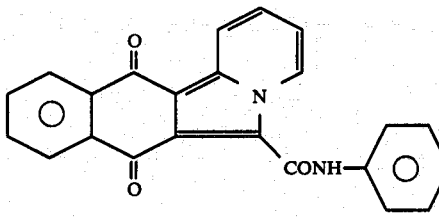

is obtained.

| Analysis: | C | H | N | O |
|---|---|---|---|---|
| Theoretical: | 67.2 | 3.2 | 10.2 | 19.4 |
| Found: | 67.2 | 3.4 | 10.2 | 19.4 |

EXAMPLE 5

By processing as in the above Example 4 but replacing the 17 parts of pyridine by 26 parts of isoquinoline, the orange-coloured compound of formula

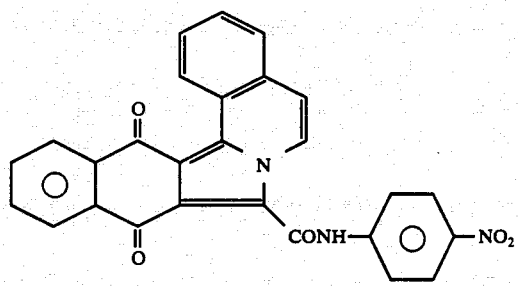

is obtained.

| Analysis: | C | H | N | O |
|---|---|---|---|---|
| Theoretical: | 70.3 | 3.3 | 9.1 | 17.3 |
| Found: | 70.2 | 3.2 | 9.4 | 17.3 |

In the following Table 1, the substituents of further compounds of formula I, which may be produced in accordance with the processing of Example 1a or 2, and their self colours are indicated. The shade of their sample dyeings in polyvinyl chloride or with the disperse dyes on polyester fibres is identical with the indicated shade or tends a little more to yellow. In any case, the dyes have the fastness properties indicated above.

The linkage of $R_1$ to the nitrogen atom is, where necessary, marked by *.

| Example No. | $R_1$ | $R_2 - R_3$ | Colour |
|---|---|---|---|
| 6 | (pyridine ring) | —CONH—⟨phenyl⟩ | red |
| 7 | " | —CONH—⟨phenyl⟩—Cl | " |
| 8 | " | —CONH—⟨phenyl⟩—Cl | " |
| 9 | " | —CONH—⟨phenyl⟩—Cl | " |
| 10 | " | —CONH—⟨phenyl⟩—CH₃ | orange |
| 11 | " | —CONH—⟨phenyl⟩—CH₃ | " |

-continued
| Example No. | $R_1$ | $R_2 - R_3$ | Colour |
|---|---|---|---|
| 12 | " | 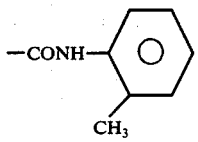 —CONH—C₆H₄—CH₃ (o-methyl) | " |
| 13 | " | 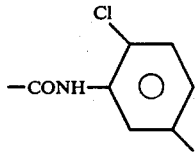 —CONH—C₆H₃—Cl₂ (2,5-dichloro) | " |
| 14 | " | —COOC₂H₅ | " |
| 15 | " | 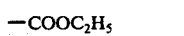 —CONH—C₆H₄—OCH₃ | red |
| 16 | " | 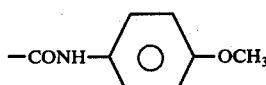 —CONH—C₆H₃(OCH₃)₂ | " |
| 17 | 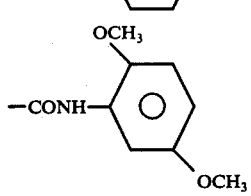 |  —CONH—C₆H₂Cl₃ | red |
| 18 | " | 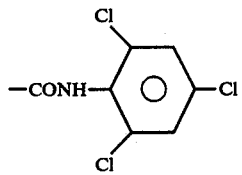 —CONH—C₆H₂Br₃ | " |
| 19 | " | 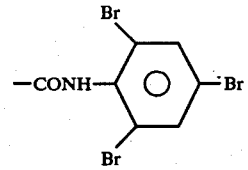 —CONH—C₆H₃(NO₂)₂ | " |
| 20 | " | 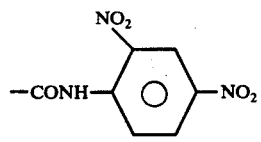 —CONH—C₆H₃(Cl)(NO₂) | " |
| 21 | " | 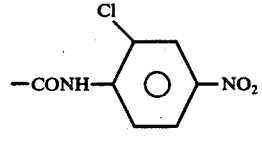 —CONH—C₆H₃(CH₃)(NO₂) | " |
| 22 | " | 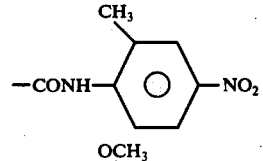 —CONH—C₆H₃(OCH₃)(NO₂) | " |
| 23 | " | 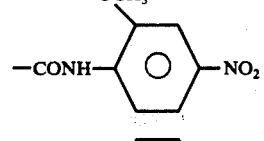 —CONH—C₆H₄—COOC₂H₅ | " |

-continued
| Example No. | R₁ | R₂ – R₃ | Colour |
|---|---|---|---|
| 24 | " | 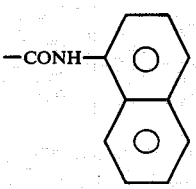 | " |
| 25 | " | 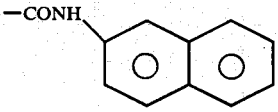 | " |
| 26 | " | 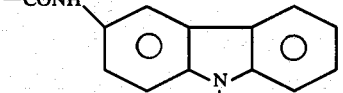 | " |
| 27 | " | 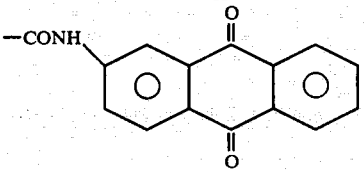 | " |
| 28 |  |  | red |
| 29 | " | 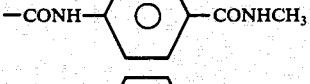 | " |
| 30 | " | 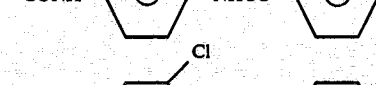 | " |
| 31 | " |  | " |
| 32 | " | 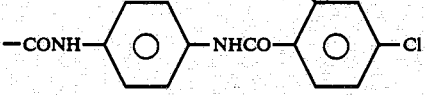 | " |
| 33 | " |  | " |
| 34 | " |  | " |
| 35 | " | —COOCH₃ | orange |
| 36 | " | 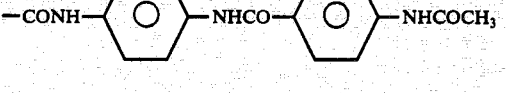 | red |

-continued

| Example No. | R₁ | R₂ – R₃ | Colour |
|---|---|---|---|
| 37 | " | —CONH—(2,5-diCl-C₆H₂)—NHCO—(C₆H₄)—NHCOCH₃ | " |
| 38 | " | —CONH—(C₆H₄)—NHCO—(C₆H₄)—Br | " |
| 39 | " | —CONH—(C₆H₄)—NHCO—(C₆H₄)—Cl | " |
| 40 | (diene) | —CONH—(2-Cl-C₆H₃)—NHCO—(2,4-diCl-C₆H₃) | red |
| 41 | " | —CONH—(C₆H₄)—CONH—(C₆H₅) | " |
| 42 | " | —CONH—(C₆H₄)—CONH—(C₆H₅) | " |
| 43 | " | —CONH—(3-Cl-C₆H₃)—CONH—(C₆H₅) | " |
| 44 | " | —CONH—(C₆H₄)—CONH—(2,5-diCl-C₆H₃) | " |
| 45 | " | —CONH—(3,5-diCl-C₆H₂)—CONH—(C₆H₄)—NHCOCH₃ | " |

| Example No. | $R_1$ | $R_2 - R_3$ | Colour |
|---|---|---|---|
| 46 | " | —CONH—(phenyl)-CONH—(2,3,4-trichlorophenyl) | " |
| 47 | (2-methylbenzyl)* | —CONH—(phenyl) | yellow |
| 48 | " | —CONH—(4-chlorophenyl) | yellow |
| 49 | " | —CONH—(3-chlorophenyl) | orange |
| 50 | " | —CONH—(2-chlorophenyl) | yellow |
| 51 | " | —CONH—(4-methylphenyl) | yellow |
| 52 | (2-methylbenzyl)* | —CONH—(3-methylphenyl) | " |
| 53 | " | —CONH—(2-methylphenyl) | " |
| 54 | " | —CONH—(2,5-dichlorophenyl) | " |
| 55 | " | —CONH—(4-methoxyphenyl) | " |
| 56 | " | —CONH—(2,4-dimethoxyphenyl) | " |

-continued
| Example No. | $R_1$ | $R_2 - R_3$ | Colour |
|---|---|---|---|
| 57 | " | 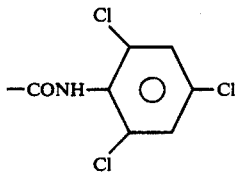 | " |
| 58 | " | 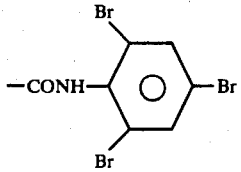 | " |
| 59 | " | 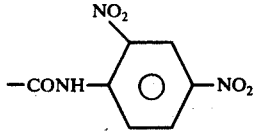 | orange |
| 60 | " | 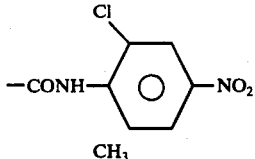 | " |
| 61 | " | 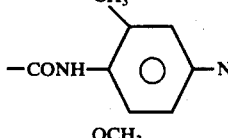 | " |
| 62 | 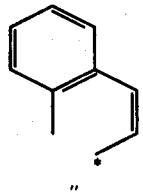 | 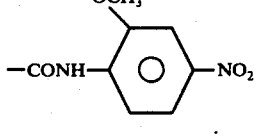 | orange |
| 63 | " | 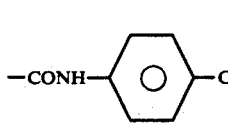 | yellow |
| 64 | " | 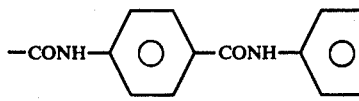 | yellow orange |
| 65 | " | 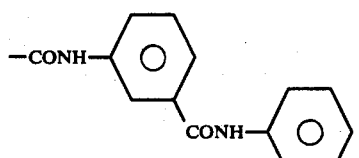 | " |
| 66 | " | 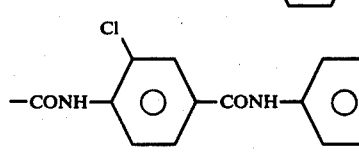 | " |
| 67 | " | 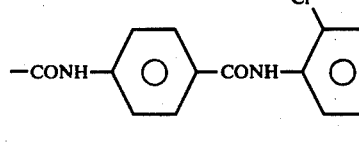 | " |

| Example No. | R₁ | R₂ – R₃ | Colour |
|---|---|---|---|
| 68 | " | -CONH-(C₆H₂(Cl)(Cl))-CONH-(C₆H₄)-NHCOCH₃ | " |
| 69 | " | -CONH-(C₆H₄)-CONH-(C₆H₂Cl₃) | " |
| 70 | " | -CONH-(1-naphthyl) | yellow |
| 71 | " | -CONH-(2-naphthyl) | yellow |
| 72 | " | -CONH-(carbazolyl) | " |
| 73 | (2-methylstyryl) | -CONH-(1-anthraquinonyl) | orange |
| 74 | " | -CONH-(C₆H₄)-CONHC₂H₅ | yellow |
| 75 | " | -CONH-(C₆H₄)-CONHCH₃ | " |
| 76 | " | -CONH-(C₆H₄)-NHCO-(C₆H₅) | " |
| 77 | " | -CONH-(C₆H₂Cl₂)-NHCO-(C₆H₅) | " |
| 78 | " | -CONH-(C₆H₄)-NHCO-(C₆H₃Cl₂) | " |

-continued

| Example No. | R₁ | R₂ - R₃ | Colour |
|---|---|---|---|
| 79 | " | —CONH—C₆H₄—NHCO—C₆H₅ | " |
| 80 | " | —CONH—C₆H₄—NHCO—C₆H₄—NO₂ | " |
| 81 | " | —COOCH₃ | " |
| 82 | " | —CONH—C₆H₄—NHCO—C₆H₄—NHCOCH₃ | " |
| 83 | " | —CONH—C₆H₂(Cl)₂—NHCO—C₆H₄—NHCOCH₃ | " |
| 84 | " | —CONH—C₆H₄—NHCO—C₆H₅ | " |
| 85 | (2-methylphenyl-CH=CH—)* | —CONH—C₆H₄—NHCO—C₆H₄—Cl | yellow |
| 86 | " | —CONH—C₆H₃(Cl)—NHCO—C₆H₃(Cl)₂ | " |
| 87 | " | —CON(CH₃)—C₆H₃(Cl)—NHCO—C₆H₃(Cl)₂ | " |
| 88 | (2-vinylphenyl)* | —COOC₂H₅ | " |

In the following Table 2, the substituents $R_1$, $R_2$, $R_3$, $m$ and the colour of further compounds of formula I, which may be produced in analogy with the operating procedure of Example 1, are indicated. The colour of their sample dyeings with the pigments in polyvinyl chloride, or with the disperse dyes on polyester fibres agrees with the colour indicated or tends slightly more to yellow. In any case, the dyes have the fastnesss properties indicated above.

The linkage of $R_1$ to the nitrogen atom is, where necessary, marked by *.

TABLE

| Example No. | $R_1$ | $R_2$ | m | $R_3$ | Colour |
|---|---|---|---|---|---|
| 89 | 2-methylbenzyl (linked via CH₂*) | —CONH— | 1 | 1-methyl-4-(NHCOC₆H₅)-anthraquinone | red |
| 90 | " | " | 1 | 1-methyl-4-(NHCO-C₆H₄-Cl)-anthraquinone | red |
| 91 | " | " | 1 | 1-methyl-4-(NHCO-2,4-Cl₂-C₆H₃)-anthraquinone | red |
| 92 | " | " | 1 | 1-methyl-4-(NHCO-2-NO₂-C₆H₄)-anthraquinone | red |
| 93 | " | " | 1 | 1-methyl-4-OH-anthraquinone | red |
| 94 | " | " | 1 | 1-methyl-3-Br-4-NH₂-anthraquinone | violet |
| 95 | " | " | 1 | 1-methyl-6,7-dichloro-anthraquinone | yellow orange |
| 96 | " | " | 1 | 1-methyl-2-CH₃-anthraquinone | yellow orange |

TABLE-continued
| Example No. | $R_1$ | $R_2$ | m | $R_3$ | Colour |
|---|---|---|---|---|---|
| 97 | " | " | 1 | 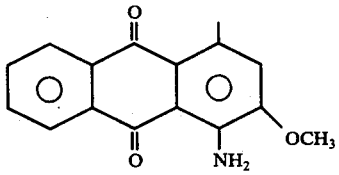 | violet |
| 98 | " | " | 1 | 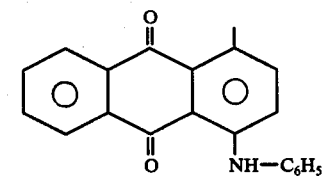 | violet |
| 99 | " | " | 1 | 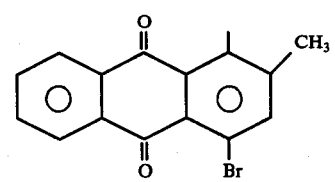 | yellow orange |
| 100 | " | " | 1 | 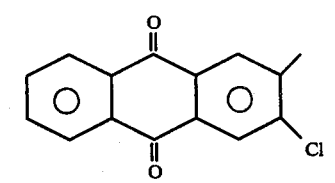 | orange |
| 101 | " | " | 1 | 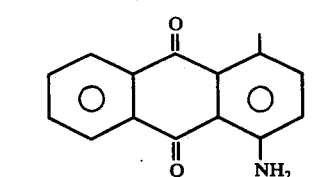 | violet |
| 102 | " | " | 1 | 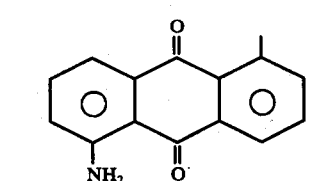 | red |
| 103 | " | " | 1 | 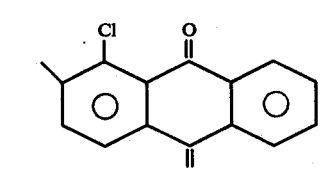 | yellow orange |
| 104 | " | " | 1 | 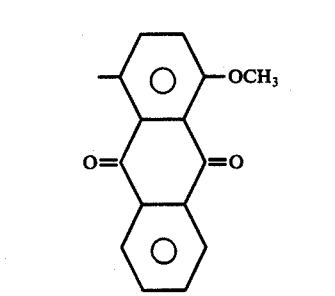 | red |

TABLE-continued

| Example No. | $R_1$ | $R_2$ | m | $R_3$ | Colour |
|---|---|---|---|---|---|
| 105 | " | " | 1 | anthraquinone-NHCO—$C_6H_5$ | orange |
| 106 | " | " | 1 | anthraquinone-NHCO—C$_6$H$_4$—Cl (4-) | orange |
| 107 | " | " | 1 | anthraquinone-NHCO—C$_6$H$_4$—Cl (2-) | orange |
| 108 | " | " | 1 | isothiazole-fused anthrone (N—S) | orange |
| 109 | " | " | 1 | pyrimidine-fused anthrone | red |
| 110 | " | " | 1 | anthraquinone—S—$C_6H_5$ | red |
| 111 | " | " | 2 | anthraquinone | red |

TABLE-continued
| Example No. | R₁ | R₂ | m | R₃ | Colour |
|---|---|---|---|---|---|
| 112 | " | " | 2 | 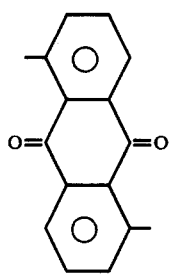 | orange red |
| 113 | " | " | 2 |  | yellow |
| 114 | " | " | 2 | 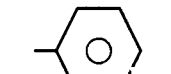 | yellow |
| 115 | " | " | 2 | 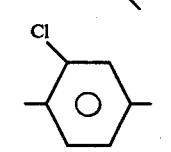 | yellow orange |
| 116 | " | " | 2 | 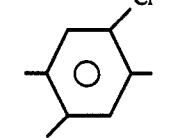 | orange |
| 117 | " | " | 2 | 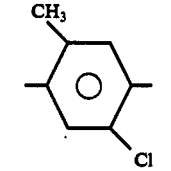 | orange |
| 118 | " | " | 2 | 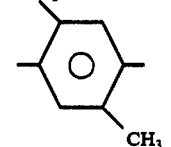 | orange |
| 119 | " | " | 2 | 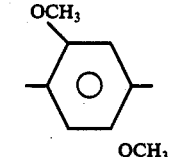 | brown |
| 120 | " | " | 2 | 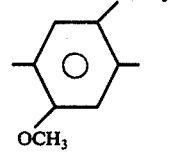 | brown |
| 121 | " | " | 2 | 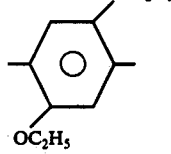 | brown |

TABLE-continued

| Example No. | R₁ | R₂ | m | R₃ | Colour |
|---|---|---|---|---|---|
| 122 | " | " | 2 | (phenyl with NO₂) | red |
| 123 | " | " | 2 | (phenyl with NO₂) | red |
| 124 | " | " | 2 | (phenyl-NHCO-phenyl) | yellow orange |
| 125 | " | " | 2 | (biphenyl) | yellow |
| 126 | " | " | 2 | (biphenyl with CH₃, CH₃) | orange |
| 127 | " | " | 2 | (biphenyl with Cl, Cl) | orange |
| 128 | " | " | 2 | (biphenyl with Cl, Cl) | orange |
| 129 | " | " | 2 | (biphenyl with CH₃, CH₃) | orange |
| 130 | " | " | 2 | (biphenyl with H₃CO, OCH₃) | brown |
| 131 | " | (N=C-O group) | 2 | (biphenyl with methyl substituents) | red |
| 132 | " | —CONH— | 2 | (naphthyl) | brown |
| 133 | " | " | 2 | (phenyl-S-phenyl) | orange |

TABLE-continued

| Example No. | R₁ | R₂ | m | R₃ | Colour |
|---|---|---|---|---|---|
| 134 | " | " | 2 | phenyl-SO₂-phenyl | orange |
| 135 | " | " | 2 | dibenzothiophene-S,S-dioxide | brown |
| 136 | " | " | 1 | acridone-like (diphenylamine with C=O bridge) | orange |
| 137 | " | " | 1 | acridone-like with NO₂ | orange |
| 138 | " | " | 1 | benzimidazolin-2-one | yellow orange |
| 139 | " | " | 1 | quinoxaline-2,3-dione | yellow orange |
| 140 | " | =N−/−NH− (imidazoline) | 1 | benzimidazolin-2-one | yellow orange |
| 141 | " | =N−/−NH− (imidazoline) | 1 | quinoxaline-2,3-dione | yellow orange |
| 142 | " | " | 1 | nitro-dimethyl-phenyl | orange |
| 143 | " | —CONH— | 2 | pyridyl | yellow |
| 144 | " | " | 2 | phenyl-N=N-phenyl | " |
| 145 | " | " | 1 | phenyl-NHCO-(2,4-dichlorophenyl) | " |
| 146 | " | " | 2 | 2,4-dimethylphenyl (CH₃) | " |

TABLE-continued
| Example No. | R₁ | R₂ | m | R₃ | Colour |
|---|---|---|---|---|---|
| 147 | " | " | 2 | 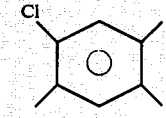 | " |
| 148 | " | " | 1 | 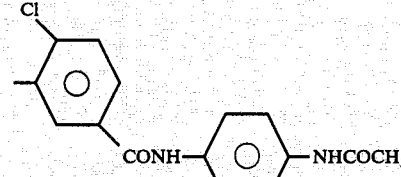 | yellow orange |
| 149 | " | " | 1 | 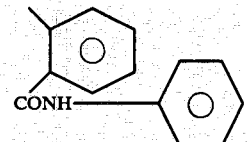 | yellow orange |
| 150 |  | " | 1 | 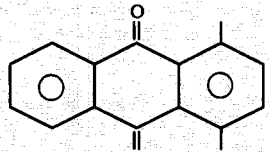 | red |
| 151 | " | " | 1 | 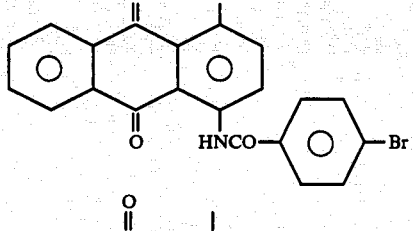 | red |
| 152 | " | " | 1 | 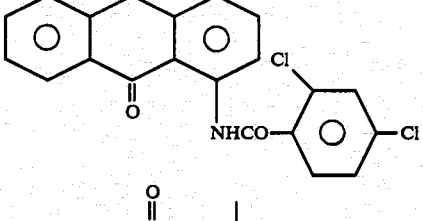 | red |
| 153 | " | " | 1 | 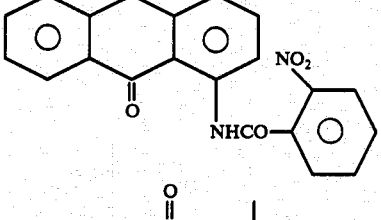 | red |
| 154 | " | " | 1 | 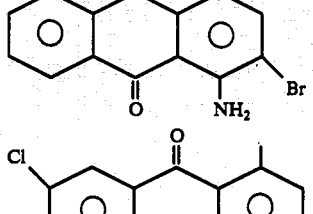 | violet |
| 155 | " | " | 1 | 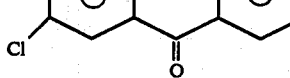 | orange-red |

| Example No. | R₁ | R₂ | m | R₃ | Colour |
|---|---|---|---|---|---|
| 156 | " | " | 1 | 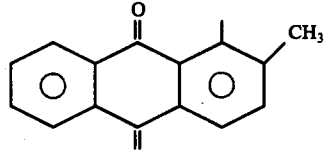 | orange-red |
| 157 | " | " | 1 | 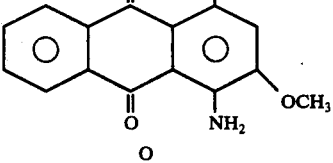 | violet |
| 158 | " | " | 1 | 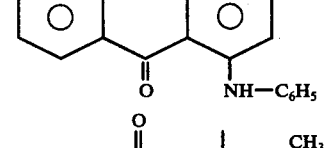 | violet |
| 159 | " | " | 1 | 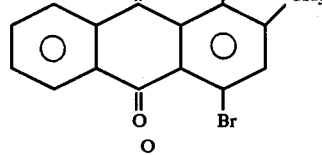 | orange-red |
| 160 | " | " | 1 | 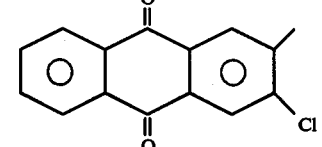 | red |
| 161 | " | " | 1 | 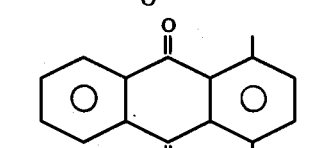 | violet |
| 162 | " | " | 1 | 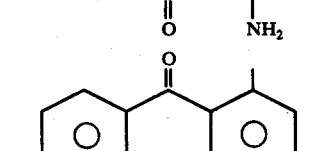 | red |
| 163 | " | " | 1 | 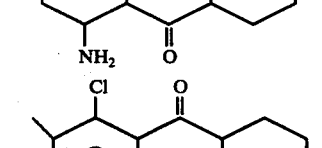 | red |
| 164 | " | " | 1 | 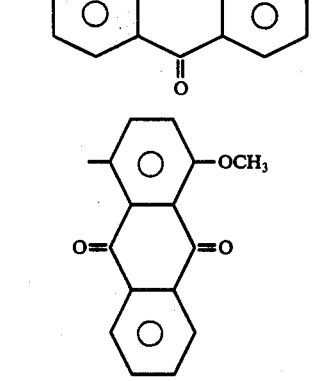 | red |

TABLE-continued
| Example No. | R₁ | R₂ | m | R₃ | Colour |
|---|---|---|---|---|---|
| 165 | " | " | 1 | 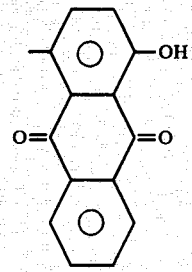 | red |
| 166 | " | " | 1 | 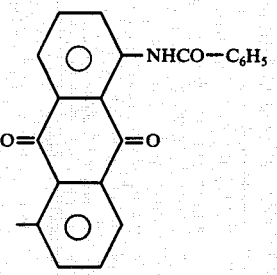 | red |
| 167 | " | " | 1 | 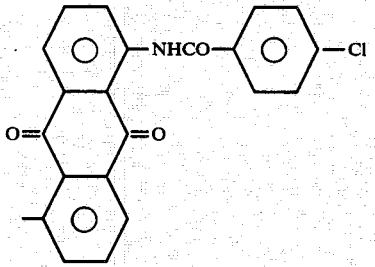 | red |
| 168 | " | " | 1 | 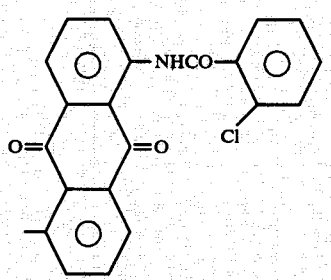 | red |
| 169 | " | " | 1 | 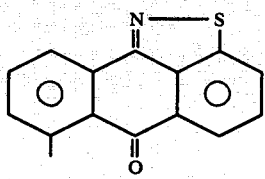 | red |
| 170 | " | " | 1 | 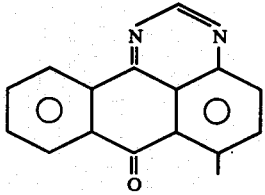 | red |
| 171 | " | " | 1 | 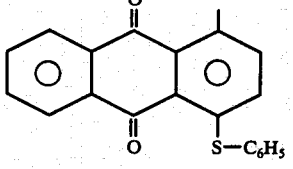 | red |

TABLE-continued
| Example No. | R₁ | R₂ | m | R₃ | Colour |
|---|---|---|---|---|---|
| 172 | " | " | 2 | 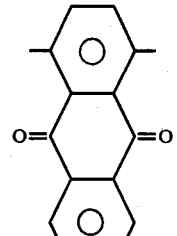 | red |
| 173 | " | " | 2 | 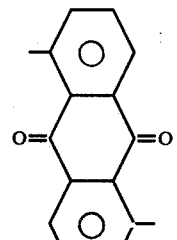 | red |
| 174 | " | " | 2 | 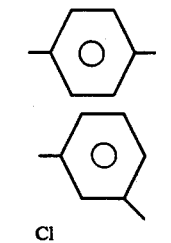 | red |
| 175 | " | " | 2 | | red |
| 176 | " | " | 2 | 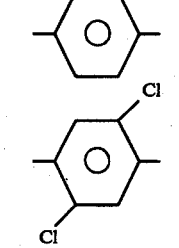 | red |
| 177 | " | " | 2 | 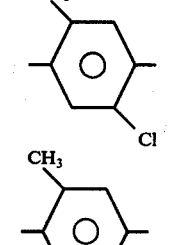 | red |
| 178 | " | " | 2 | | red |
| 179 | " | " | 2 | | red |
| 180 | " | " | 2 | 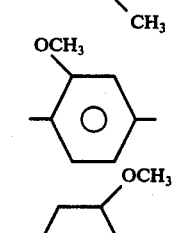 | red |
| 181 | " | " | 2 | 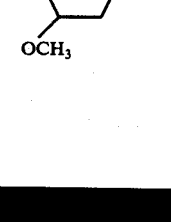 | violet |

TABLE-continued
| Example No. | $R_1$ | $R_2$ | m | $R_3$ | Colour |
|---|---|---|---|---|---|
| 182 | " | " | 2 | 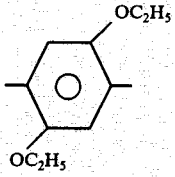 2,5-di(OC₂H₅)phenyl | red |
| 183 | " | " | 2 | 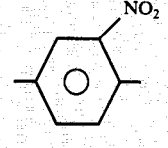 nitrophenyl | red |
| 184 | " | " | 2 | 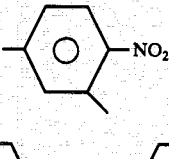 nitro-methylphenyl | red |
| 185 | " | " | 2 | 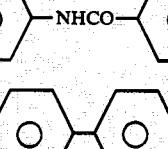 phenyl-NHCO-phenyl | red |
| 186 | " | " | 2 | 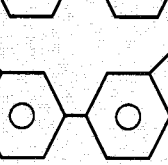 biphenyl | red |
| 187 | " | " | 2 | 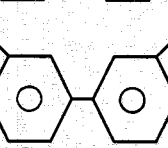 dimethylbiphenyl | red |
| 188 | " | " | 2 | 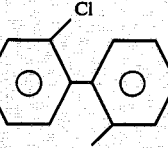 dichlorobiphenyl | red |
| 189 | " | " | 2 | 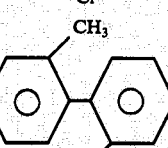 dichlorobiphenyl | red |
| 190 | " | " | 2 | 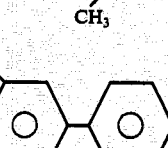 dimethylbiphenyl | red |
| 191 | " | " | 2 | 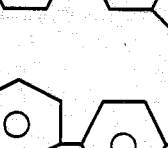 dimethoxybiphenyl | red |
| 192 | " |  | 2 | 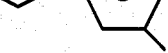 | red |

TABLE-continued
| Example No. | R₁ | R₂ | m | R₃ | Colour |
|---|---|---|---|---|---|
| 193 | " | —CONH— | 2 | 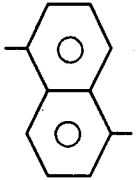 | red |
| 194 | " | " | 2 | 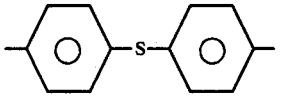 | red |
| 195 | " | " | 2 | 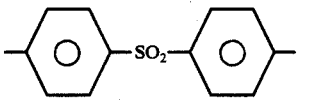 | red |
| 195a | " |  | 2 | 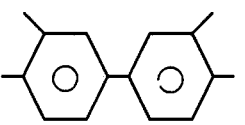 | reddish violet |
| 195b | 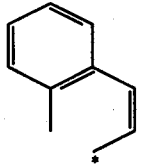 | " | 2 | " | bluish red |
| 196 | " | —CONH— | 2 |  | red |
| 197 | " | " | 1 | 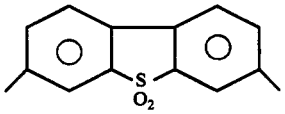 | red |
| 198 | " | " | 1 | 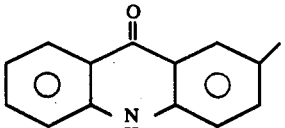 | red |
| 199 | " | " | 1 | 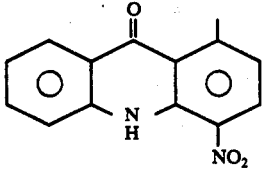 | red |
| 200 | " | " | 1 | 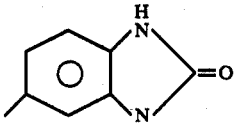 | red |
| 201 | " | 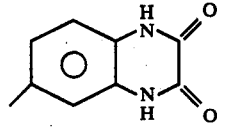 | 1 |  | red |
| 202 | " | " | 1 | 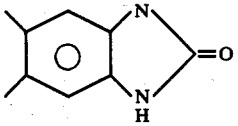 | red |

TABLE-continued

| Example No. | R₁ | R₂ | m | R₃ | Colour |
|---|---|---|---|---|---|
| 203 | " | " | 1 | [4-methylphenyl-NO₂] | red |
| 204 | " | —CONH— | 1 | [phenyl-NHCO-dichlorophenyl] | red |
| 205 | " | " | 1 | [4-chlorophenyl-CONH-phenyl-NHCOCH₃] | red |
| 206 | " | " | 1 | [methylphenyl-CONH-dichlorophenyl] | red |
| 207 | " | " | 1 | [anthraquinone-methylphenyl] | orange |
| 208 | [o-tolyl-CH=] | [−C(=N−)S−] | 2 | [biphenyl-dimethyl] | red |

APPLICATION EXAMPLE 1

0.2 Parts of the pigment, obtained in accordance with Example 1, (c) and 5 parts of titanium dioxide pigment intimately stirred with a mixture consisting of 63 parts of polyvinyl chloride emulsion,
32 parts of dioctyl phthalate,
3 parts of a commercial epoxy softener,
1,5 parts of a commercial stabilizer (bariumcadmium complex),
0.5 parts of a commercial chelator, and heated on a roller mill between two rollers to 160°. The rollers rotate at 20 to 25 r.p.m. to exert friction and to obtain a good distribution of the pigment.

The mixture is subsequently extruded as a film of 0.3 mm thickness. The film is pigmented in a reddish yellow shade which has very good light and migration fastness.

APPLICATION EXAMPLE 2

A mixture of 7 parts of the dye, produced in accordance with Example 1a, 4 parts of sodium dinaphthyl methane disulphonate, 4 parts of sodium cetyl sulphate and 5 parts of anhydrous sodium sulphate is ground in a ball mill over the course of 48 hours to give a fine powder.

1 Part of the obtained dye preparation is pasted with a small amount of water and the resulting suspension is added through a sieve to a bath of 4000 parts of water containing 3 parts of sodium lauryl sulphate. The bath proportion is 1 : 40. 100 Parts of a purified fabric of polyester fibre are entered into the dyebath at 40°-50°, which is then set with an emulsion of 20 parts of a chlorinated benzene in water. The bath is slowly heated to 100° and the fabric dyed at 95°-100° for 1 to 2 hours. The fabric dyed in brilliant yellow shades is washed, soaped, washed again and dried. The level dyeing has notable fastness to light, cross dyeing, washing, water, sea water, perspiration, sublimation, gas fumes, thermofixation, pleating and permanent press finishing.

What is claimed is:

1. A compound of formula I,

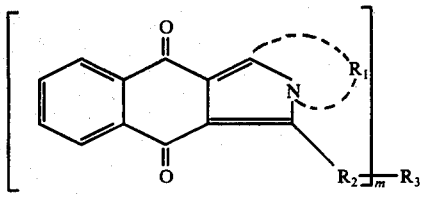

in which
R₁ is a group —CH=CH—CH=CH— or

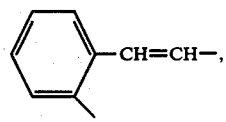

which group is unsubstituted or substituted by up to two substituents selected from chlorine bromine, methyl and $C_{1-4}$alkoxy or by one substituent selected from aminocarbonyl, $C_{1-4}$alkylaminocarbonyl, phenylaminocarbonyl, carboxyl, $C_{1-4}$alkoxycarbonyl and phenoxycarbonyl, either m is 1 and R₂ and R₃, together are cyano; 2- or 4-pyridyl; 2-quinolyl; 2,4-dihydroxy-1,3,5-triazinyl; phenyl, unsubstituted or substituted by up to two substituents selected from chlorine, bromine, methyl, $C_{1-4}$alkoxy, nitro and cyano; or —CO—R₅, where
R₅ is hydroxy, methyl, $C_{1-4}$alkoxy, phenyl or phenoxy, which phenyl or phenoxy is unsubstituted or substituted by up to two substituents selected from chlorine, bromine, methyl, nitro and cyano, provided that only one cyano is borne thereby, or
m is 1, R₂ is —CO—NR₄—, in which R₄ is hydrogen or $C_{1-4}$alkyl, and R₃ is hydrogen; $C_{1-4}$alkyl; carbazolyl; thiazole anthronyl; anthraquinonyl which is unsubstituted or substituted by up to two substituents selected from chlorine, bromine, methyl, $C_{1-4}$alkoxy; amino, hydroxy, phenylamino, phenylmercapto, nitro, benzoylamino, mono- or dichlorobenzoylamino, mono- or dibromo- benzoylamino and nitrobenzoylamino; pyridyl; naphthyl; benzimidazolonyl; phenyl, unsubstituted or substituted by up to three substituents selected from up to three substituents selected from chlorine and bromine, up to two substituents selected from nitro, methyl and $C_{1-4}$ alkoxy and one substituent selected from benzoylamino, mono- or dichlorobenzoylamino, mono- or dibromobenzoylamino, nitrobenzoylamino, $C_{1-4}$alkylcarbonylaminobenzoylamino, aminocarbonyl, $C_{1-4}$alkylaminocarbonyl, phenylaminocarbonyl, mono-, di- or trichlorophenylaminocarbonyl, mono-, di- or tribromophenylaminocarbonyl, $C_{1-4}$alkylcarbonylaminophenylaminocarbonyl and $C_{1-4}$alkoxycarbonyl, or
m is 1, R₂ is a radical (a), (b) or (c)

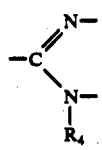 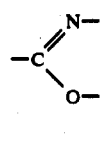 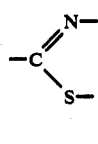

(a)      (b)      (c)

in which R₄ is as defined above, and
R₃ is $C_{1-4}$alkylene; divalent pyridyl; divalent naphthyl; divalent benzimidazolonyl; divalent benzene, unsubstituted or substituted by up to two substituents selected from chlorine, bromine, methyl, $C_{1-4}$alkoxy and nitro; any aromatic radical as R₃ is bound to R₂ through adjacent carbon atoms; or m is 2, R₂ is —CONR₄—, where R₄ is as defined above, and R₃ is $C_{1-4}$alkylene; divalent anthraquinonyl, unsubstituted or substituted by up to two substituents selected from chlorine, bromine, methyl, $C_{1-4}$alkoxy, amino, hydroxy, phenylamino, phenylmercapto, nitro, benzoylamino, mono- or di-chlorobenzoylamino, mono- or di-bromobenzoylamino and nitrobenzoylamino; divalent pyridyl; divalent napththyl; divalent benzimidazolonyl; divalent benzene, unsubstituted or substituted by up to two substituents selected from chlorine, bromine, methyl, $C_{1-4}$alkoxy and nitro; divalent diphenyl, unsubstituted or substituted by up to two substitutents selected from chlorine, bromine, methyl, $C_{1-4}$alkoxy and nitro; a radical (d)

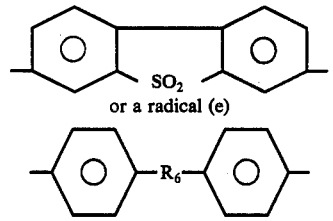

or a radical (e)

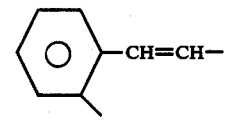

in which
R₆ is —S—, —SO₂— or —NH—CO— or;
m is 2, R₂ is a radical (a), (b) of (c), above, and R₃ is an unsubstituted tetravalent diphenyl radical, the links between such radical and radicals (a), (b) or (c) being through adjacent carbon atoms.

2. A compound of claim 1, wherein R₁ is an unsubstituted —CH=CH—CH=CH— or

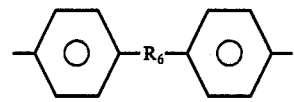

group, either m is 1 and R₂ and R₃, together, are —CO—R₅, in which R₅ is as defined in claim 1, or
m is 1, R₂ is —CONR₄—, in which R₄ is hydrogen or $C_{1-4}$alkyl, and R₃ is carbazoyl; thiazole anthronyl; anthraquinonyl, unsubstituted or substituted by up to two substituents selected from chlorine, bromine, methyl, $C_{1-4}$alkoxy, amino, hydroxy, phenylamino, phenylmercapto, nitro, benzoylamino, mono- or dichlorobenzoylamino, mono- or di-bromobenzoylamino, and nitrobenzoylamino; pyridyl; naphthyl; benzimidazolonyl; phenyl, unsubstituted or substituted by up to three substituents selected from up to three substituents selected from chlorine and bromine, up to two substituents selected from nitro, methyl and methoxy and one substituent selected from benzoylamino, mono- or dichlorobenzoylamino, mono- or di-bromobenzoylamino, nitrobenzoylamino, $C_{1-4}$alkylcarbonylaminobenzoylamino, aminocarbonyl, $C_{1-4}$alkylaminocarbonyl, phenylaminocarbonyl, mono-, di- or trichlorophenylaminocarbonyl, mono-, di- or tribromophenylaminocarbonyl, $C_{1-4}$alkylcarbonylaminophenylaminocarbonyl and $C_{1-4}$alkoxycarbonyl; or $m$ is 1, $R_2$ is a radical (a(, (b) or (c), and $R_3$ is divalent pyridyl; divalent naphthyl; divalent benzimidazolonyl; divalent benzene, unsubstituted or substituted by up to two substituents selected from chlorine, bromine, methyl, $C_{1-4}$alkoxy and nitro; or $m$ is 2, $R_2$ is —CONR$_4$—, where $R_4$ is as defined above, and $R_3$ is divalent anthraquinonyl, unsubstituted or substituted by up to two substituents selected from chlorine, bromine, methyl, $C_{1-4}$alkoxy, amino, hydroxy, phenylamino, phenylmercapto, nitro, benzoylamino, mono- or di-chlorobenzoylamino, mono- or di-bromobenzoylamino and nitrobenzoylamino; divalent pyridyl; divalent naphthyl; divalent benzimidazolonyl; divalent benzene, unsubstituted or substituted by up to two substituents selected from chlorine, bromine, methyl, $C_{1-4}$alkoxy and nitro; divalent diphenyl, unsubstituted or substituted by up to two substituents selected from chlorine, bromine, methyl, $C_{1-4}$alkoxy and nitro; a radical (d) or a radical (e) or $m$ is 2, $R_2$ is a radical (a), (b) or (c), above, and $R_3$ is an unsubstituted tetravalent diphenyl radical.

3. A compound of claim 2, wherein $m$ is 1.

4. A compound of claim 3, wherein $R_2$ and $R_3$, together, are —COR$_5$.

5. A compound of claim 4, in which $R_5$ is $C_{1-4}$alkoxy.

6. A compound of claim 3, in which $R_2$ is —CONR$_4$—, in which $R_4$ is hydrogen or $C_{1-4}$alkyl, and $R_3$ is carbazolyl; thiazole anthronyl; anthraquinonyl, unsubstituted or substituted by up to two substituents selected from chlorine, bromine, methyl, $C_{1-4}$alkoxy, amino, hydroxy, phenylamino, phenylmercapto, nitro, benzoylamino, mono- or dichlorobenzoylamino, mono- or di-bromobenzoylamino, and nitrobenzoylamino; pyridyl; naphthyl; benzimidazolonyl; phenyl, unsubstituted or substituted by up to three substituents selected from chlorine and bromine, up to two substituents selected from nitro, methyl and methoxy groups and one substituent selected from benzoylamino, mono- or di-chlorobenzoylamino, mono- or dibromobenzoylamino, nitrobenzoylamino, $C_{1-4}$alkylcarbonylaminobenzoylamino, aminocarbonyl, $C_{1-4}$alkylaminocarbonyl, phenylaminocarbonyl, mono-, di- or trichlorophenylaminocarbonyl, mono-, di- or tribromophenylaminocarbonyl, $C_{1-4}$alkylcarbonylaminophenylaminocarbonyl and $C_{1-4}$alkoxycarbonyl.

7. A compound of claim 6, in which $R_3$ is unsubstituted anthraquinonyl or anthraquinonyl substituted as defined in claim 6.

8. A compound of claim 7, in which $R_4$ is hydrogen.

9. A compound of claim 6, in which $R_3$ is unsubstituted phenyl or phenyl substituted as defined in claim 6.

10. A compound of claim 3, in which $R_2$ is a radical (a), (b) or (c), and $R_3$ is divalent pyridyl; divalent naphthyl; divalent benzimidazolonyl; divalent benzene, unsubstituted or substituted by up to two substituents selected from chlorine, bromine, methyl, $C_{1-4}$alkoxy and nitro.

11. A compound of claim 10, in which $R_3$ is unsubstituted divalent benzene or divalent benzene substituted as defined in claim 10.

12. A compound of claim 11, in which $R_2$ is a radical (a).

13. A compound of claim 2, in which $m$ is 2.

14. A compound of claim 13, in which $R_2$ is —CONR$_4$— and $R_3$ is divalent anthraquinonyl, unsubstituted or substituted by up to two substituents selected from chlorine, bromine, methyl, $C_{1-4}$alkoxy, nitro, benzoylamino, mono- or di-chlorobenzoylamino, mono- or di-bromobenzoylamino and nitrobenzoylamino; divalent pyridyl; divalent naphthyl; divalent benzimidazolonyl; divalent benzene, unsubstituted or substituted by up to two substituents selected from chlorine, bromine, methyl, $C_{1-4}$alkoxy and nitro; divalent diphenyl, unsubstituted or substituted by up to two substituents selected from chlorine, bromine, methyl, $C_{1-4}$alkoxy and nitro; a radical (d) or a radical (e).

15. A compound of claim 14, wherein $R_3$ is unsubstituted divalent anthraquinonyl, or divalent anthraquinonyl substituted as defined in claim 14.

16. A compound of claim 14, wherein $R_3$ is unsubstituted divalent benzene or divalent benzene substituted as defined in claim 14.

17. A compound of claim 14, wherein $R_3$ is unsubstituted divalent diphenyl or divalent diphenyl substituted as defined in claim 14.

18. A compound of claim 13, in which $R_2$ is a radical (a), (b) or (c), and $R_3$ is an unsubstituted tetravalent diphenyl radical.

19. A compound of claim 18, in which $R_2$ is a radical (a).

20. A compound of claim 2, in which $R_1$ is unsubstituted

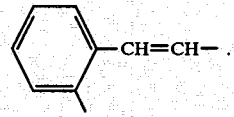

21. A compound of claim 2, in which either $m$ is 1, $R_2$ is —CONH— and $R_3$ is phenyl, unsubstituted or substituted by up to two substituents selected from chlorine, bromine, nitro, methoxy and ethoxy or by one substituent selected from phenylaminocarbonyl, chlorophenylaminocarbonyl, bromophenylaminocarbonyl, acetylaminophenylaminocarbonyl, benzoylamino, chlorobenzoylamino, bromobenzoylamino and acetylaminobenzoylamino; or anthraquinonyl, unsubstituted or mono-substituted by chlorine, bromine, methyl, methoxy, amino, nitro or benzoylamino; or $m$ is 2, $R_2$ is —CONH— and $R_3$ is 1,3-, 1,4- or 1,5-phenylene or 4,4'-diphenylene, which phenylene and diphenylene are unsubstituted or substituted by one or two substituents selected from chlorine, bromine, methyl, methoxy, ethoxy and nitro, or $m$ is 2, $R_2$ is

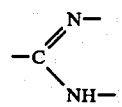

and $R_3$ is an unsubstituted tetravalent diphenylene radical.

22. A compound of claim 21, in which $m$ is 1, $R_2$ is —CONH— and $R_3$ is phenyl, unsubstituted or substituted by up to two substituents selected from chlorine, bromine, nitro, methoxy and ethoxy or by one substituent selected from phenylaminocarbonyl, chlorophenylaminocarbonyl, bromophenylaminocarbonyl, acetylaminophenylaminocarbonyl, benzoylamino, chlorobenzoylamino, bromobenzoylamino and acetylaminobenzoylamino; or anthraquinonyl, unsubstituted or mono-substituted by chlorine, bromine, methyl, methoxy, amino, nitro, or benzoylamino.

23. A compound of claim 22, in which $R_3$ is unsubstituted phenyl or phenyl substituted as defined in claim 22.

24. A compound of claim 22, in which $R_3$ is unsubstituted anthraquinonyl or anthraquinonyl substituted as defined in claim 22.

25. A compound of claim 21, in which $m$ is 2.

26. A compound of claim 25, in which $R_2$ is —CONH— and $R_3$ is 1,3-, 1,4- or 1,5-phenylene or 4,4'-diphenylene, which phenylene and diphenylene are unsubstituted or substituted by one or two substituents selected from chlorine, bromine, methyl, methoxy, ethoxy and nitro.

27. A compound of claim 26, in which $R_3$ is unsubstituted phenylene or phenylene substituted as defined in claim 26.

28. A compound of claim 26, in which $R_3$ is unsubstituted diphenylene or diphenylene substituted as defined in claim 26.

29. A compound of claim 25, in which $R_2$ is

[structure: —C with =N— and —NH—]

and $R_3$ is an unsubstituted diphenylene radical.

30. A compound of claim 2, in which $R_1$ is unsubstituted —CH=CH—CH=CH—.

31. A compound according to claim 21, of the formula

[structure]

32. A compound of claim 12, of formula Ib.

Ib

[structure]

in which $R_{11}$ is unsubstituted —CH=CH—CH=CH— or

[structure: phenyl-CH=CH—]

in which the C* is bound to the nitrogen atom, $R_{12}$ is —CONH— and, either $m$ is 1 and $R_{13}$ is 4-phenylaminocarbonylphenyl or anthraquinonyl, or $m$ is 2 and $R_{13}$ is 2-chloro-1,4-phenylene, 2-methyl-1,4-phenylene, 2,5-dichloro-1,4-phenylene, 2,4-dichloro-1,5-phenylene or 2,2'-dimethoxy-4,4'-diphenylene.

33. A compound of claim 32, in which $m$ is 1.

34. A compound of claim 33, in which $R_{13}$ is 4-phenylaminocarbonylphenyl.

35. A compound of claim 33, in which $R_{13}$ is anthraquinonyl.

36. A compound of claim 32, in which $m$ is 2.

37. A compound of claim 36, in which $R_{13}$ is 2-chloro-1,4-phenylene, 2-methyl-1,4-phenylene, 2,5-dichloro-1,4-phenylene or 2,4-dichloro-1,5-phenylene.

38. A compound of claim 36, in which $R_{13}$ is 2,2'-dimethoxy-4,4'-diphenylene.

39. A compound of claim 32, in which $R_{11}$ is unsubstituted —CH=CH—CH=CH—.

40. A compound of claim 32, in which $R_{11}$ is unsubstituted

[structure: phenyl-CH=CH—]

41. A compound of claim 34, of formula

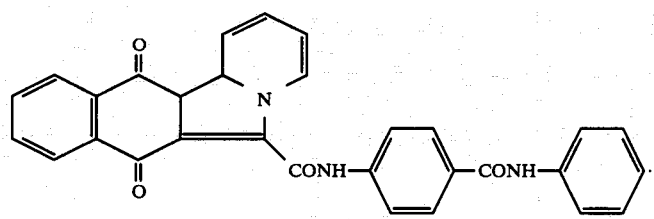
42. A compound of claim 35, of formula
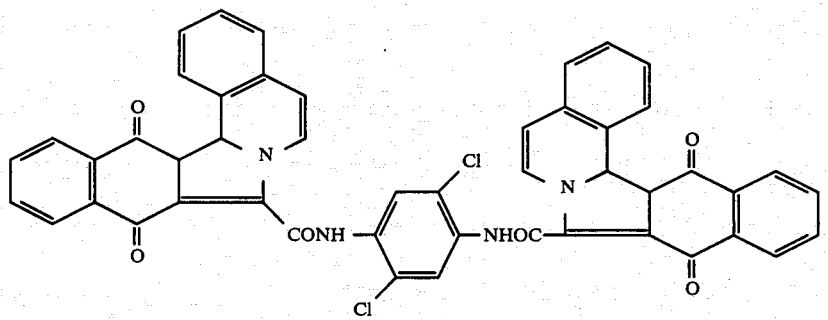
43. A compound of claim 37, of formula
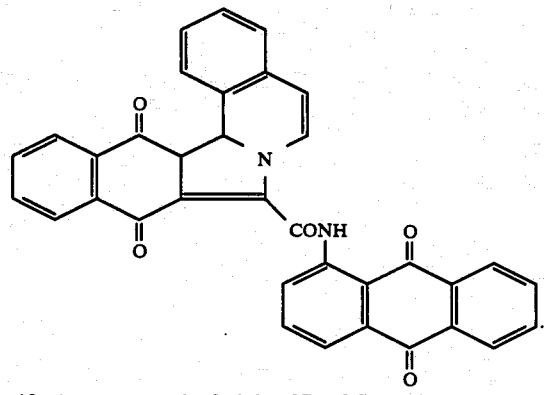
44. A compound of claim 37, of formula
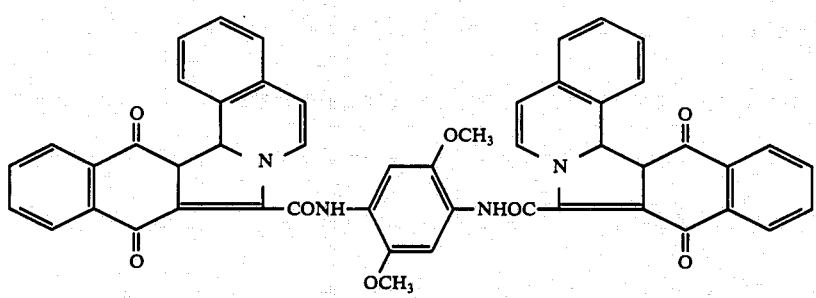
45. A compound of claim 37, of formula
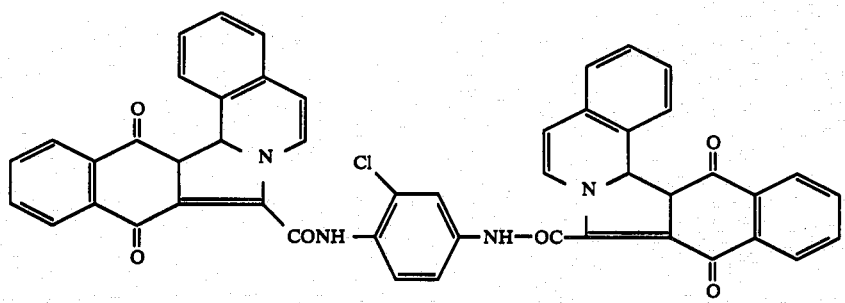
46. A compound of claim 38, of formula

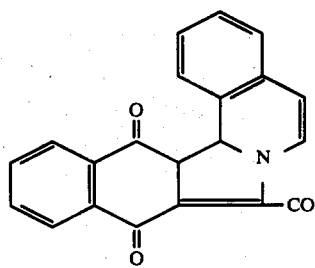
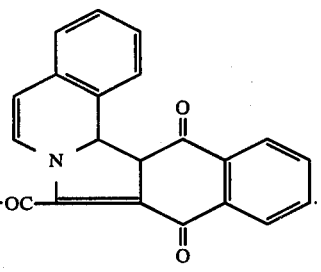
47. A compound of formula Ic
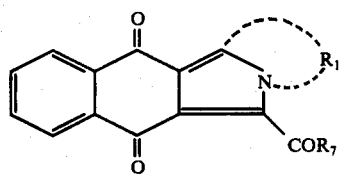
in which
R₁' is a group —CH=CH—CH=CH— or
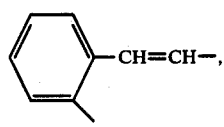
which group is unsubstituted or substituted by up to two substituents selected from chlorine, bromine, methyl and $C_{1-4}$alkoxy, or by a $C_{1-4}$alkylcarbonyl or benzoyl group,
R₇ is a hydroxyl, $C_{1-4}$alkoxy or phenoxy group.
48. A compound of claim 47, in which R₁' is unsubstituted.
* * * * *